United States Patent
Murakami

(10) Patent No.: US 10,326,900 B2
(45) Date of Patent: Jun. 18, 2019

(54) IMAGE FORMING APPARATUS INCLUDING A CHARGE PROCESSING SECTION AND AN OPERATION SECTION

(71) Applicant: Sharp Kabushiki Kaisha, Osaka-shi, Osaka (JP)

(72) Inventor: Koichi Murakami, Osaka (JP)

(73) Assignee: Sharp Kabushiki Kaisha, Sakai, Osaka (JP)

( * ) Notice: Subject to any disclaimer, the term of this patent is extended or adjusted under 35 U.S.C. 154(b) by 193 days.

(21) Appl. No.: 14/378,660

(22) PCT Filed: Feb. 6, 2013

(86) PCT No.: PCT/JP2013/052677
§ 371 (c)(1),
(2) Date: Aug. 14, 2014

(87) PCT Pub. No.: WO2013/121943
PCT Pub. Date: Aug. 22, 2013

(65) Prior Publication Data
US 2015/0002897 A1     Jan. 1, 2015

(30) Foreign Application Priority Data
Feb. 15, 2012   (JP) ................................. 2012-030094

(51) Int. Cl.
*H04N 1/00* (2006.01)
*G03G 21/02* (2006.01)
(Continued)

(52) U.S. Cl.
CPC ..... *H04N 1/00543* (2013.01); *G03G 15/5016* (2013.01); *G03G 21/02* (2013.01);
(Continued)

(58) Field of Classification Search
CPC .......... H04N 1/00543; H04N 1/00564; H04N 1/00496; H04N 1/00493; H04N 1/34
(Continued)

(56) References Cited

U.S. PATENT DOCUMENTS 5,444,779 A * 8/1995 Daniele .................. G03G 21/02
358/462
6,516,157 B1 * 2/2003 Maruta .................. G03G 21/02
399/79
(Continued)

FOREIGN PATENT DOCUMENTS

JP      11-122405 A     4/1999
JP      2000-125235 A   4/2000
(Continued)

OTHER PUBLICATIONS

International Search Report, issued in PCT/JP2013/052677, dated Mar. 12, 2013.

*Primary Examiner* — Benjamin O Dulaney
(74) *Attorney, Agent, or Firm* — Birch, Stewart, Kolasch & Birch, LLP

(57) ABSTRACT

Provided is an image forming apparatus including a charge processing section and an operation section that are brought closer in height to each other, thus improving the operability of a user.
An image forming apparatus (100) includes a coin insertion processing section (110), an operation panel (120) and an electrophotography printer (130). The coin insertion processing section (110) is configured to accept money and then execute charge processing so as to permit image formation by the image forming apparatus (100). The operation panel (120) is configured to, when the coin insertion processing section (110) executes the charge processing, accept setting of image formation by the image forming apparatus (100). The electrophotography printer (130) is configured to form
(Continued)

an image of the read image data based on setting at the operation panel (120). The coin insertion processing section (110) is disposed at a height equal to a height of the operation panel (120).

2 Claims, 5 Drawing Sheets

(51) Int. Cl.
H04N 1/34 (2006.01)
G03G 15/00 (2006.01)

(52) U.S. Cl.
CPC ..... *H04N 1/00278* (2013.01); *H04N 1/00493* (2013.01); *H04N 1/00496* (2013.01); *H04N 1/00564* (2013.01); *H04N 1/34* (2013.01); *H04N 2201/0091* (2013.01)

(58) Field of Classification Search
USPC ........................................................ 358/1.15
See application file for complete search history.

(56) References Cited

U.S. PATENT DOCUMENTS

| | | | | |
|---|---|---|---|---|
| 6,891,636 B1* | 5/2005 | Kawai | ................... | G06Q 30/02 358/1.12 |
| 7,286,782 B2* | 10/2007 | Nomura | ................. | G03G 21/02 399/79 |
| 2004/0012636 A1* | 1/2004 | Hasebe | ................... | G06Q 30/04 715/771 |
| 2004/0063404 A1* | 4/2004 | Morishita | .......... | H04N 1/00132 455/41.2 |
| 2005/0282626 A1* | 12/2005 | Manfredi | ............. | A63F 3/00157 463/25 |
| 2006/0092434 A1* | 5/2006 | Koakutsu | ........... | H04N 1/00127 358/1.1 |
| 2006/0152753 A1* | 7/2006 | Nakai | ................... | G03G 21/046 358/1.15 |
| 2008/0137138 A1* | 6/2008 | Matoba | .............. | G03G 15/5075 358/1.15 |
| 2009/0117970 A1* | 5/2009 | De Waal | ................. | G07F 17/32 463/20 |
| 2010/0142990 A1* | 6/2010 | Mandel | ................... | B65H 29/00 399/107 |
| 2010/0172631 A1* | 7/2010 | Nagasawa | ............ | G03G 15/326 386/241 |
| 2014/0376033 A1* | 12/2014 | Tokishige | .......... | G03G 15/5004 358/1.14 |
| 2015/0002897 A1 | 1/2015 | Murakami | | |

FOREIGN PATENT DOCUMENTS

| | | |
|---|---|---|
| JP | 2005-266359 A | 9/2005 |
| JP | 2006-84827 A | 3/2006 |
| JP | 2008-148075 A | 6/2008 |
| JP | 2009-258518 A | 11/2009 |
| JP | 2009-288398 A | 12/2009 |
| JP | 2010-284887 A | 12/2010 |
| JP | 2013-167709 A | 8/2013 |

* cited by examiner

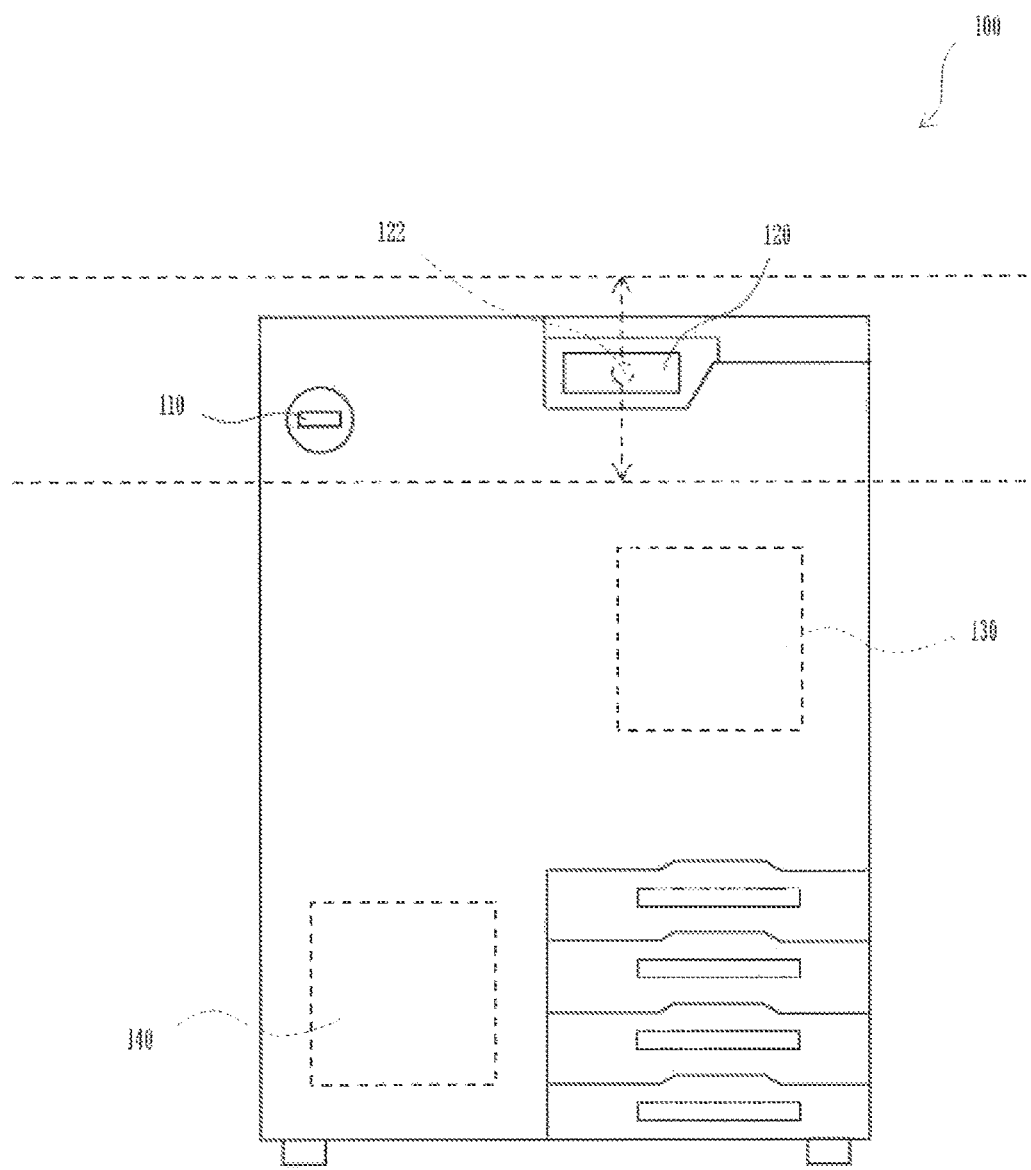

IMAGE FORMING APPARATUS INCLUDING A CHARGE PROCESSING SECTION AND AN OPERATION SECTION

TECHNICAL FIELD

The present invention relates to image forming apparatuses provided with an image forming section that operates in accordance with the charge state.

BACKGROUND ART

Image forming apparatuses provided in convenience stores include a coin vendor and a multifunction peripheral (MFP), and are configured so that, in response to inserting a coin into the coin vendor, a predetermined image is formed with the MFP.

In this way, since the coin vendor and the MFP are operated as a unit, a coin vendor and the MFP provided at distant places means deterioration in their operability.

Then, a coin vendor and a MFP in a convenience store are disposed close to each other (e.g., see Patent Literature 1).

CITATION LIST

Patent Literature

Patent Document 1 Patent Application Publication No. 2005-266359

SUMMARY OF INVENTION

Technical Problem

In an image forming apparatus provided in a convenience store, however, a coin insertion processing section (charge processing section) of the coin vendor and an operation section of the MFP are different in height as described in Patent Literature 1, and so the operability of the apparatus for users is bad, meaning physical burden for the user.

In view of the aforementioned problem, it is an object of the present invention to provide an image forming apparatus configured to bring a charge processing section and an operation section closer in height to each other, thus improving the operability of a user.

Solution to Problem

An image forming apparatus of the present invention reads image data to form an image. The image forming apparatus of one present invention includes: a charge processing section; an operation section; and a first image formation section.

The charge processing section is configured to accept money and then to execute charge processing so as to permit image formation by the image forming apparatus. The operation section is configured to, when the charge processing section executes the charge processing, accept setting of image formation by the image forming apparatus. The first image formation section is configured to form an image of the read image data based on setting at the operation section.

The charge processing section is disposed at a height equal to a height of the operation section.

This configuration makes the user's flow line for the operation of the image forming apparatus substantially linear, whereby the operability of the image forming apparatus of users can be improved. This can reduce the physical burden on users and can improve the visibility of users for the image forming apparatus.

Advantageous Effects of Invention

The image forming apparatus of the present invention includes a charge processing section and an operation section that are brought closer in height to each other, thus improving the operability of a user.

BRIEF DESCRIPTION OF DRAWINGS

FIG. 5 is a front view illustrating the configuration of an image forming apparatus according to Embodiment 5 of the present invention.

DESCRIPTION OF EMBODIMENTS

The following describes image forming apparatuses according to embodiments of the present invention in detail, with reference to the drawings.

Firstly, Embodiment 1 of the present invention is described below.

Figure 1:
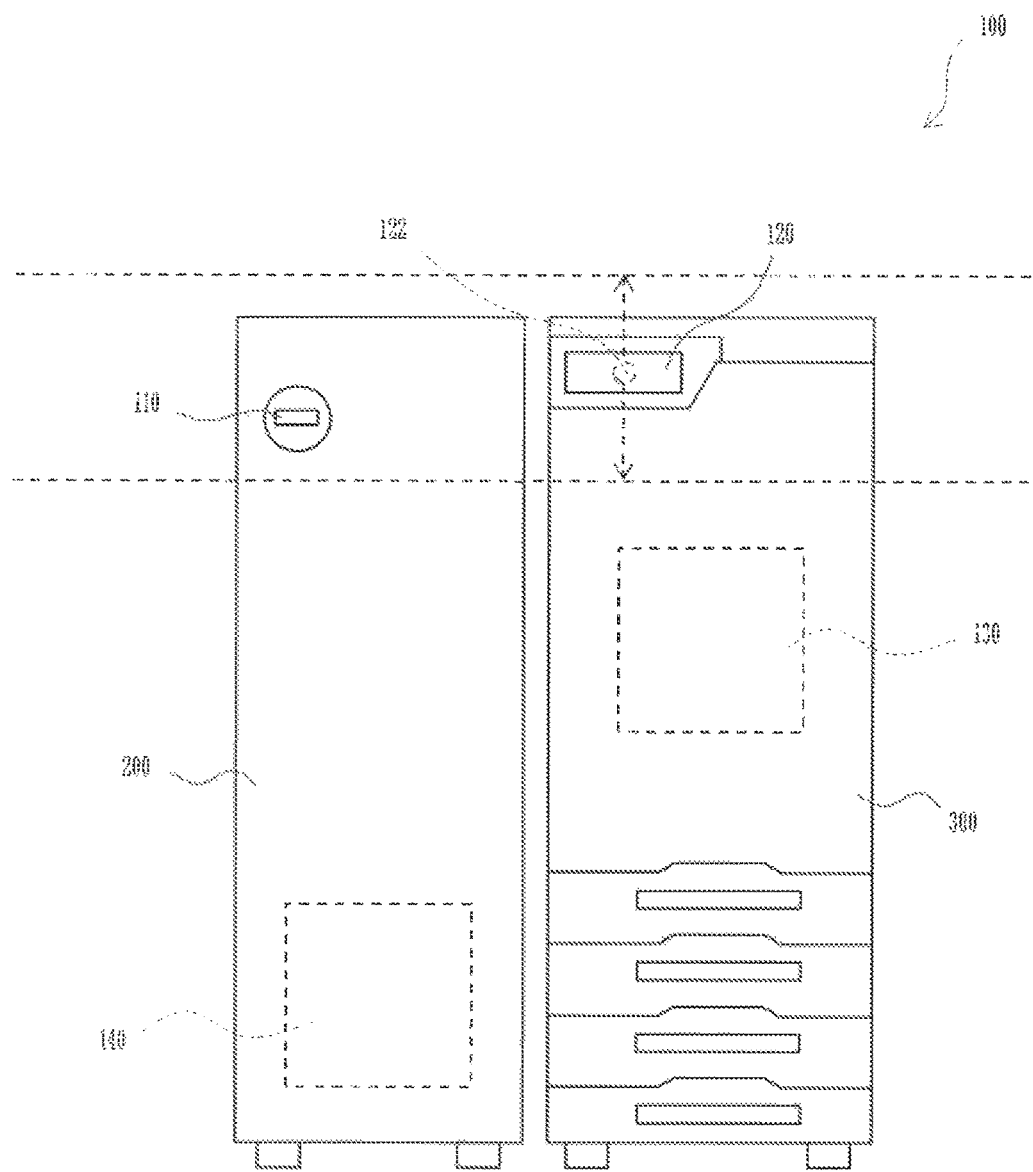
FIG. 1 is a front view illustrating the configuration of an image forming apparatus according to Embodiment 1 of the present invention.

FIG. 1 is a front view illustrating the configuration of an image forming apparatus 100 according to Embodiment 1 of the present invention.

The image forming apparatus 100 reads image data to form an image, and includes a coin vendor 200 and a MFP 300. The image forming apparatus 100 includes a coin insertion processing section 110, an operation panel 120, and an electrophotography printer 130.

The coin insertion processing section 110 is a charge processing section configured to accept a coin and then permit image formation by the image forming apparatus 100. The charge processing is to, in response to a coin inserted by a user, permit image formation with the electrophotography printer 130 in exchange for the coin. FIG. 1 describes the coin insertion processing section 110 accepting a coin as one example of the charge processing section, and the charge processing section may be further provided with a bill insertion slot to accept a bill.

The operation panel 120 is an operation section configured to, when charge processing is executed at the coin insertion processing section 110, accept setting for image formation by the image forming apparatus 100. The operation panel 120 is disposed at a flat part of the MFP 300. The angle to displace the operation panel 120 may be rotatable about one side as an axis. The operation panel 120 used is a touch panel.

The electrophotography printer 130 is a first image formation section configured to form an image of read image data based on the setting at the operation panel 120. The electrophotography printer 130 is configured to include a photoreceptor, around which a charger, an exposure device, a developing device and a transfer device are disposed in this order from the upstream of the photoreceptor, and include a fixing device disposed downstream of the sheet-conveyance path. The electrophotography printer 130 is mainly used to form an image on ordinary paper.

The coin insertion processing section 110 is disposed at a height equal to that of the operation panel 120. The coin insertion processing section 110 of the present embodiment is disposed within a range of 20 cm both upward and downward from a center position 122 of the operation panel 120 in the vertical direction. In this range, a user hardly moves their arms or neck in the vertical direction when they insert a coin through the coin insertion processing section 110 and next manipulate the operation panel 120.

That is, this configuration makes the user's flow line for the operation of the image forming apparatus 100 substantially linear, whereby the operability of the image forming apparatus 100 by users can be improved. This can reduce the physical burden on users and can improve the visibility of users for the image forming apparatus 100.

Preferably the image forming apparatus 100 is further provided with a sublimation printer 140. The sublimation printer 140 is a second image formation section, which is disposed independently of the electrophotography printer 130, and is configured to form an image of read image data based on the setting at the operation panel 120. The sublimation printer 140 is one type of thermal-transfer printers, and applies heat to an ink ribbon with solid ink applied thereon via a print head to let the ink sublime, and attach the ink to paper exclusively used for this purpose that is coated with resin. The sublimation printer 140 is mainly used to form an image on such exclusive paper.

This configuration allows a user to select the electrophotography printer 130 or the sublimation printer 140 for use, which can give users more options for the image formation on sheets.

The sublimation printer 140 is preferably disposed beyond the range of the flat face to the bottom face of the electrophotography printer 130 in the vertical direction.

Since the sublimation printer 140 can be considered to be less frequently used by users, this configuration including the sublimation printer 140 at a place different from the electrophotography printer 130 can effectively use the internal space of the coin vendor 200.

Next, the following describes Embodiment 2 of the present invention. In the following description of embodiments, the descriptions of the parts common to Embodiment 1 are omitted appropriately.

Figure 2:
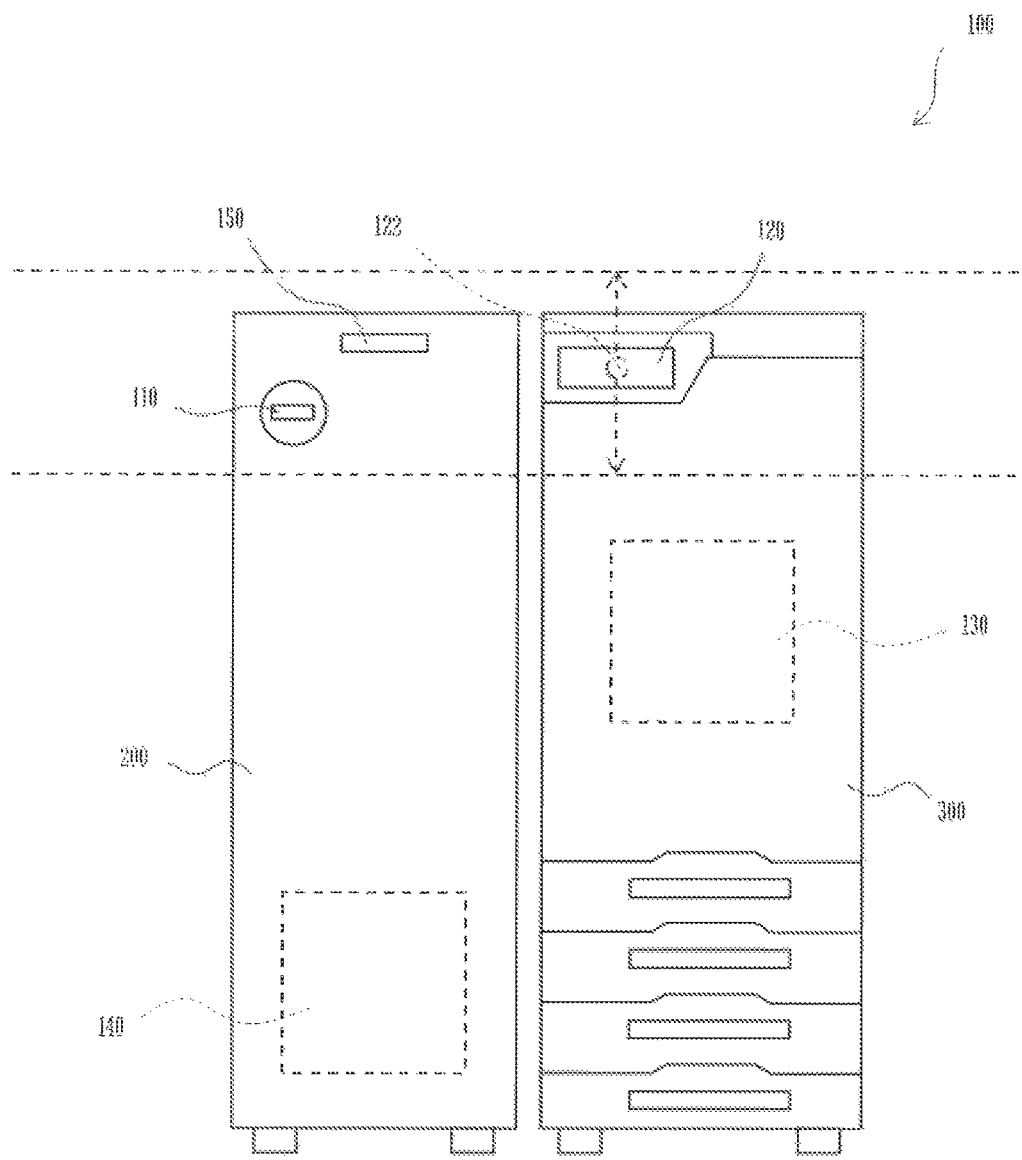
FIG. 2 is a front view illustrating the configuration of an image forming apparatus according to Embodiment 2 of the present invention.

FIG. 2 is a front view illustrating the configuration of an image forming apparatus 100 according to Embodiment 2 of the present invention.

The image forming apparatus 100 is further provided with a media slot section 150, onto which a medium to store predetermined image data can be inserted. Exemplary media includes a USB memory and a SD memory card. The image forming apparatus 100 is configured to read image data stored in the medium, and form an image on a sheet with an electrophotography printer 130 or a sublimation printer 140. Reading of image data stored in the medium requires charge processing by a coin insertion processing section 110.

The media slot section 150 is preferably disposed at a height equal to that of an operation panel 120. The media slot section 150 of the present embodiment is disposed within a range of 20 cm both upward and downward from a center position 122 of the operation panel 120 in the vertical direction. In this range, a user hardly moves their arms or neck in the vertical direction when they insert a coin through the coin insertion processing section 110, then manipulate the operation panel 120, and next insert a medium into the media slot section 150.

That is, this configuration makes the user's flow line for the operation of the image forming apparatus 100 substantially linear, whereby the operability of the image forming apparatus 100 by users can be improved. This can reduce the physical burden on users and can improve the visibility of users for the image forming apparatus 100.

This configuration further can improve the visibility of users for the image forming apparatus 100, and so after the image formation on a sheet, this configuration can prevent the user from leaving the medium at the media slot section 150.

Next, the following describes Embodiment 3 of the present invention.

Figure 3:
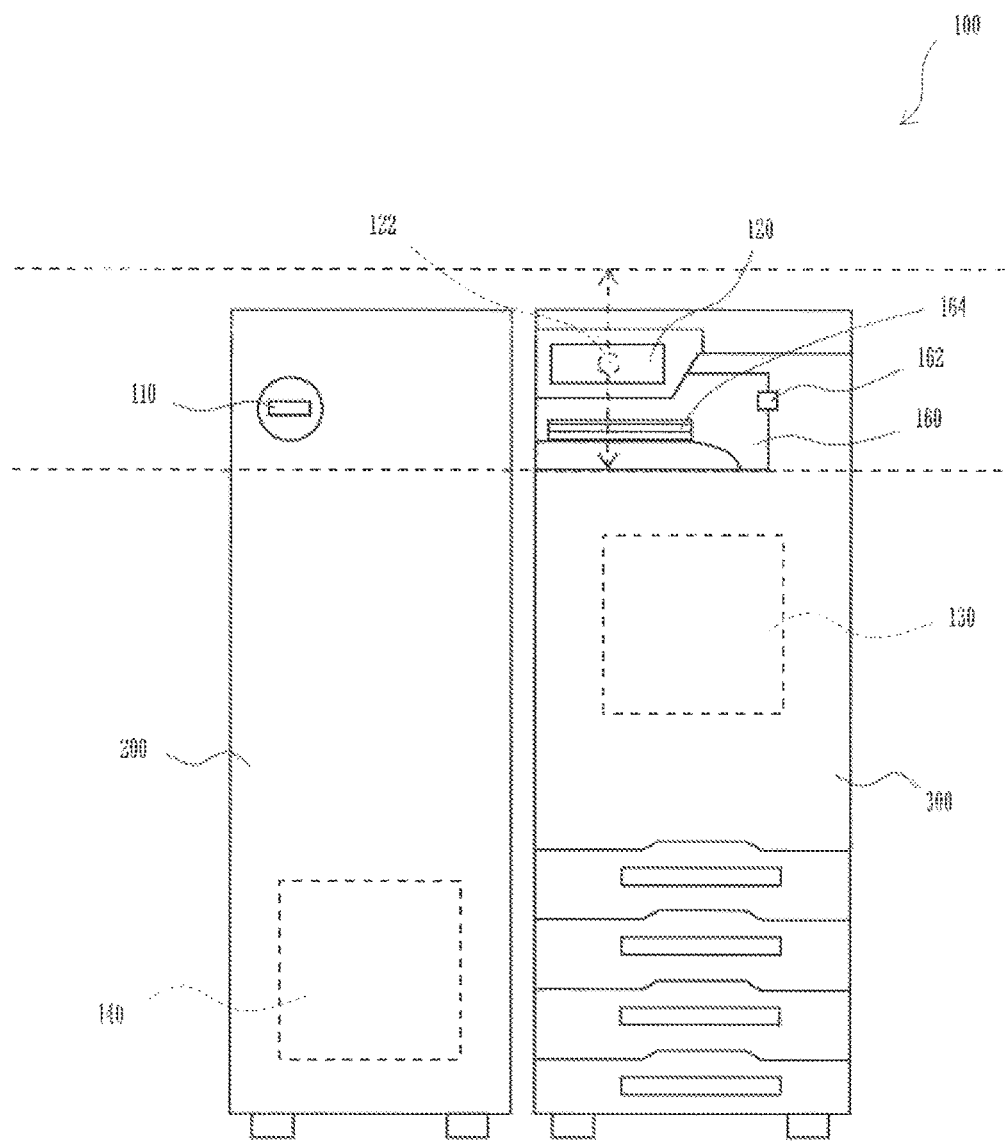
FIG. 3 is a front view illustrating the configuration of an image forming apparatus according to Embodiment 3 of the present invention.

FIG. 3 is a front view illustrating the configuration of an image forming apparatus 100 according to Embodiment 3 of the present invention.

The image forming apparatus 100 is further provided with an in-body copy receiving section 160 to load sheets subjected to image formation. The in-body copy receiving section 160 loads a sheet 164 that is subjected to image formation at an electrophotography printer 130 and is discharged from a sheet outlet 162.

The in-body copy receiving section 160 is preferably disposed at a height equal to that of an operation panel 120. The in-body copy receiving section 160 of the present embodiment is disposed within a range of 20 cm both upward and downward from a center position 122 of the operation panel 120 in the vertical direction. In this range, a user hardly moves their arms or neck in the vertical direction when they insert a coin through the coin insertion processing section 110, then manipulate the operation panel 120, and next take the sheet 164 from the in-body copy receiving section 160.

That is, this configuration makes the user's flow line for the operation of the image forming apparatus 100 substantially linear, whereby the operability of the image forming apparatus 100 by users can be improved. This can reduce the physical burden on users and can improve the visibility of users for the image forming apparatus 100.

This configuration further can improve the visibility of users for the image forming apparatus 100, and so after the image formation on a sheet, this configuration can prevent the user from leaving the sheet 164 at the in-body copy receiving section 160.

Next, the following describes Embodiment 4 of the present invention.

Figure 4:
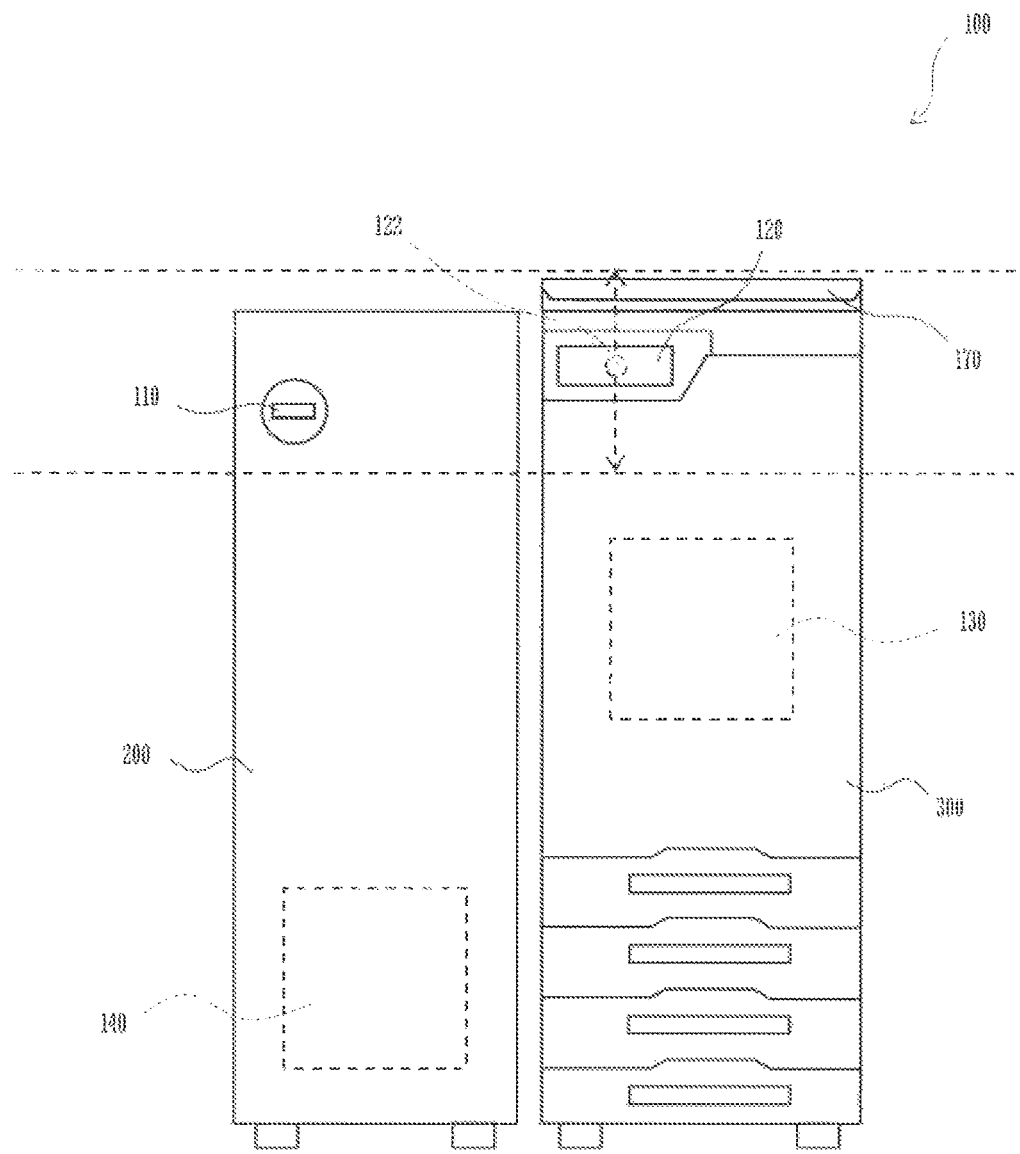
FIG. 4 is a front view illustrating the configuration of an image forming apparatus according to Embodiment 4 of the present invention.

FIG. 4 is a front view illustrating the configuration of an image forming apparatus 100 according to Embodiment 4 of the present invention.

The image forming apparatus 100 is further provided with a scanner section 170 to read image data of a document. The scanner section 170 is disposed at the uppermost face of the image forming apparatus 100 with consideration given to the convenience of a user. The image forming apparatus 100 reads image data on a document that is read by the scanner section 170, and forms an image on a sheet with an electrophotography printer 130 or a sublimation printer 140. Reading of image data on a document with the scanner section 170 requires charge processing by a coin insertion processing section 110.

The scanner section 170 is preferably disposed at a height equal to that of an operation panel 120. The scanner section 170 of the present embodiment is disposed within a range of 20 cm both upward and downward from a center position 122 of the operation panel 120 in the vertical direction. In this range, a user hardly moves their arms or neck in the vertical direction when they insert a coin through the coin insertion processing section 110, then manipulate the operation panel 120, and next read a document with the scanner section 170.

That is, this configuration makes the user's flow line for the operation of the image forming apparatus 100 substantially linear, whereby the operability of the image forming apparatus 100 by users can be improved. This can reduce the physical burden on users and can improve the visibility of users for the image forming apparatus 100.

This configuration further can improve the visibility of users for the image forming apparatus 100, and so after the image formation on a sheet, this configuration can prevent the user from leaving the document at the scanner section 170.

Next, the following describes Embodiment 5 of the present invention.

FIG. 5 is a front view illustrating the configuration of an image forming apparatus 100 according to Embodiment 5 of the present invention.

The image forming apparatuses 100 in Embodiments 1 to 4 include the coin vendor 200 and the MFP 300 that are physically separated, which may be of an integrated type as in the present embodiment.

This configuration also makes the user's flow line for the operation of the image forming apparatus 100 substantially linear, whereby the operability of the image forming apparatus 100 by users can be improved. This can reduce the physical burden on users and can improve the visibility of users for the image forming apparatus 100.

Finally, the above described embodiments are to be considered in all respects as illustrative and not restrictive. The scope of the invention is indicated by the appended claims rather than by the foregoing description. All changes which come within the meaning said range of equivalency of the claims are intended to be embraced therein.

REFERENCE SIGNS LIST 100 image forming apparatus
110 coin insertion processing section
120 operation panel
122 center position
130 electrophotography printer
140 sublimation printer
150 media slot section
160 in-body copy receiving section
170 scanner section

The invention claimed is:
1. An image forming apparatus that reads image data to form an image, comprising:
  a coin vendor;
  an multi-function printer (MFP); and
  an operation section configured to accept setting for image formation, wherein
  the coin vendor includes
    a coin insertion processing section configured to accept money and then to execute charge processing so as to permit the image formation by the MFP; and
    a media slot section for insertion of a medium to store the image data:
  the MFP includes a first image formation section configured to perform the image formation of the image data based on the setting from the operation section when the coin insertion processing section executes the charge processing;
  the coin vendor is disposed next to the MFP in a horizontal direction and independently from the MFP;
  the media slot section is disposed within a predetermined range upward from a height of the operation section in a vertical direction, and is disposed just below a top surface of the coin vendor; and
  the coin insertion processing section is disposed within another predetermined range downward from the height of the operation section in the vertical direction.
2. The image forming apparatus according to claim 1, further comprising:
  a second image formation section arranged independently of the first image formation section and configured to perform the image formation of the image data based on the setting from the operation section, wherein
  the first image formation section is an electrophotography printer; and
  the second image formation section is a sublimation printer disposed on a lower side of the coin insertion processing section.

* * * * *